United States Patent
Wegelin et al.

(10) Patent No.: US 10,687,340 B2
(45) Date of Patent: *Jun. 16, 2020

(54) WIRELESS SENSOR NETWORK

(71) Applicant: GOJO Industries, Inc., Akron, OH (US)

(72) Inventors: Jackson William Wegelin, Stow, OH (US); Chip Curtis, West Dundee, IL (US)

(73) Assignee: GOJO Industries, Inc., Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/292,533

(22) Filed: Mar. 5, 2019

(65) Prior Publication Data

US 2019/0200364 A1 Jun. 27, 2019

Related U.S. Application Data

(63) Continuation of application No. 15/236,573, filed on Aug. 15, 2016.
(Continued)

(51) Int. Cl.
*H04W 72/08* (2009.01)
*H04W 4/70* (2018.01)
(Continued)

(52) U.S. Cl.
CPC ........ *H04W 72/082* (2013.01); *H04B 17/318* (2015.01); *H04W 4/70* (2018.02);
(Continued)

(58) Field of Classification Search
CPC ..... H04W 4/005; H04W 4/70; H04W 72/082; H04W 72/0446; H04W 52/0206;
(Continued)

(56) References Cited

U.S. PATENT DOCUMENTS

| | | | |
|---|---|---|---|
| 9,591,525 B2 * | 3/2017 | Popa ..................... | H04W 28/08 |
| 2002/0097681 A1 * | 7/2002 | Treister ................. | H04W 84/20 370/238 |

(Continued)

OTHER PUBLICATIONS

Int. Search Report/Written Opinion cited in PCT Application No. PCT/US2016/046964 dated Nov. 8, 2016, 14 pgs.
(Continued)

*Primary Examiner* — Shailendra Kumar
(74) *Attorney, Agent, or Firm* — Cooper Legal Group, LLC

(57) ABSTRACT

One or more techniques and/or systems are provided for automatically forming a wireless sensor network, implementing power management for the wireless sensor network, and/or self-healing within the wireless sensor network. For example, hub devices, configured to forward messages through the wireless sensor network to a gateway device having access to a network, may automatically join and configure into the wireless sensor network by locating and connecting to master devices using signal frequencies representing numbers of hops to the gateway device. A hub device may be configured to transition between a low power sleep state for power conservation and an awakened normal operational state for transmitting timing signals according to a duty cycle, and thus the hub device may be capable of operating from a battery. If a hub device determines that a master device has become inoperable, the hub device may automatically search for a new master device.

20 Claims, 16 Drawing Sheets

Related U.S. Application Data

(60) Provisional application No. 62/207,033, filed on Aug. 19, 2015.

(51) Int. Cl.
*H04W 56/00* (2009.01)
*H04W 72/04* (2009.01)
*H04B 17/318* (2015.01)
*H04W 52/02* (2009.01)
*H04W 84/20* (2009.01)
*H04W 84/18* (2009.01)
*H04W 88/16* (2009.01)

(52) U.S. Cl.
CPC ... *H04W 52/0206* (2013.01); *H04W 56/0015* (2013.01); *H04W 72/0446* (2013.01); *H04W 72/0453* (2013.01); *H04W 72/0486* (2013.01); *H04W 84/20* (2013.01); *H04W 84/18* (2013.01); *H04W 88/16* (2013.01); *Y02D 70/142* (2018.01)

(58) Field of Classification Search
CPC ......... H04W 56/0015; H04W 72/0486; H04W 72/0453; H04W 84/20; H04W 84/18; H04W 88/16; H04B 17/318; Y02D 70/00; Y02D 70/142
See application file for complete search history.

(56) References Cited

U.S. PATENT DOCUMENTS

| | | | |
|---|---|---|---|
| 2005/0207376 A1* | 9/2005 | Ashwood-Smith | H04L 45/20 370/338 |
| 2009/0168703 A1* | 7/2009 | Pandey | H04W 8/005 370/329 |
| 2010/0008272 A1* | 1/2010 | Messinger | H04Q 9/00 370/311 |
| 2010/0103924 A1* | 4/2010 | Rao | H04W 16/14 370/351 |
| 2012/0002549 A1* | 1/2012 | Dempo | H04L 45/125 370/235 |
| 2012/0245729 A1 | 9/2012 | Wegelin et al. | |
| 2013/0250823 A1* | 9/2013 | Gaylard | H04W 4/005 370/310 |
| 2014/0074285 A1 | 3/2014 | Wegelin et al. | |
| 2014/0366264 A1 | 12/2014 | Ciavarella et al. | |

OTHER PUBLICATIONS

"An Ontology Driven Software Framework for the Healthcare Applications based on ANT+Protocol", Nadeem Qaisar Mehmood, Rosario Culmone and Leonardo Mostarda, 2014, 28th International Conference on Advanced Information Networking and Applications Workshop, 8 pgs.

* cited by examiner

WIRELESS SENSOR NETWORK

RELATED APPLICATION

This application is a continuation of U.S. Non-Provisional application Ser. No. 15/236,573, titled "WIRELESS SENSOR NETWORK" and filed on Aug. 15, 2016, which claims priority to U.S. Provisional Application No. 62/207,033, titled "WIRELESS SENSOR NETWORK" and filed on Aug. 19, 2015. U.S. Non-Provisional application Ser. No. 15/236,573 and U.S. Provisional Application No. 62/207,033 are incorporated herein by reference.

TECHNICAL FIELD

The instant application is generally directed towards systems and techniques for automatically forming a wireless sensor network, managing power within the wireless sensor network, and/or self-healing within the wireless sensor network.

BACKGROUND

Many locations, such as hospitals, factories, restaurants, homes, etc., utilize devices for hygiene, such as dispensers to dispense material, touch free faucets for sinks, an air freshener, a paper towel dispenser, flush valves for toilets, people counters (e.g., to count a number of people entering a hospital patient room), hygiene opportunity devices (e.g., a device that may determine that a nurse came within a proximity of a patient bed, and thus should sanitize), etc. Many of these devices may collect information, such as a count of people entering the bathroom, a number of dispense events of a sanitizer dispenser, an error of a flush valve, a hygiene opportunity, etc. Evaluation of such information may be useful, such as to determine whether hospital workers are complying with hygiene standards or to notify a custodian that a sanitizer dispenser is empty. Accordingly, such devices may utilize various communication mechanisms for transmitting data. However, the devices and/or communication equipment (e.g., hubs, routers, gateways, repeaters, etc.) may expend a substantial amount of energy for communication, and thus may be unable to operate merely using a battery power source. Unfortunately, a power outlet may be unavailable and/or susceptible to people unplugging devices or communication equipment from the power outlet (e.g., a user may unplug a sanitizer dispenser in order to plug in a phone charger).

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for automatic formation of a wireless sensor network, managing power within the wireless sensor network, and/or self-healing within the wireless sensor network are provided herein. For example, a wireless sensor network may be comprised of one or more gateways (e.g., a communication device having network access through WiFi, a cellular connection, and/or an Ethernet connection such as power over Ethernet), hub devices (e.g., a device, such as a people counter, a dispenser, a wireless communication device, etc., configured to forward communication messages), and/or endpoints (e.g., a dispenser, a hygiene compliance device, a people counter, and/or any other device that may transmit event data, such as dispense event data, diagnostic data, a count of people entering a room, a hygiene opportunity, etc.).

The wireless sensor network may be automatically formed such as by adding a hub device to the wireless sensor network. The hub device may iteratively utilize (e.g., by performing an automatic network connection operation upon being powered up) a sequence of frequencies until a first master device advertising an available address for slave devices to join is identified. The first master device may comprise the gateway device or a second hub device advertising a pathway connection to the gateway device through the wireless sensor network. A frequency of the set of frequencies may be indicative of a number of hops to the gateway device from the first master device (e.g., a smallest frequency representing a gateway device, a second to smallest frequency representing hub devices that are a single hop from the gateway device, a largest frequency representing hub devices that are the most hops from the gateway device, etc.).

Responsive to identifying the first master device, a first communication channel, where the hub device is a first slave device for the first communication channel, is established with the first master device. The hub device may advertise availability of a second communication channel, where the hub device is a second master device for the second communication channel, for connection to by slave devices. The second master device is configured to forward event data, (e.g., diagnostic data received from a dispenser, a count people determined by a people counter, etc.) received over the second communication channel from a connected slave device, over the first communication channel to the first master device for transmission the gateway device (e.g., and transmission from the gateway device over a network such as to a server or a cloud computing environment).

The hub device may be configured to broadcast timing signals, according to a duty cycle, over the second communication channel for one or more connected slave devices. For example, the duty cycle may indicate that the hub device is to transition into a low power sleep state, and then awaken every 2 seconds to broadcast timing signals and wait for any acknowledgement messages provided by connected slave devices responsive to the timing signals. In this way, the hub device and connected slave devices may synchronize the timing of transitions between sleeping and waking up so that such devices may otherwise transition into a sleep state for reduce power consumption. Thus, the hub device may be capable of being powered from a battery power source. Responsive to receiving, over the second communication channel, an acknowledgment message, comprising event data, from a connected slave device in response to a timing signal, the event data may be forwarded to the first master device for transmission to the gateway device.

The wireless sensor network may be self-healing. For example, responsive to the hub device determining that the first master device is not in an operational state, the hub device may iteratively utilize the sequence of frequencies until a new master device is identified. A new communication channel may be established, where the hub device is a new slave device for the new communication channel, with the new master device for forwarding event data through the new master device to the gateway device.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
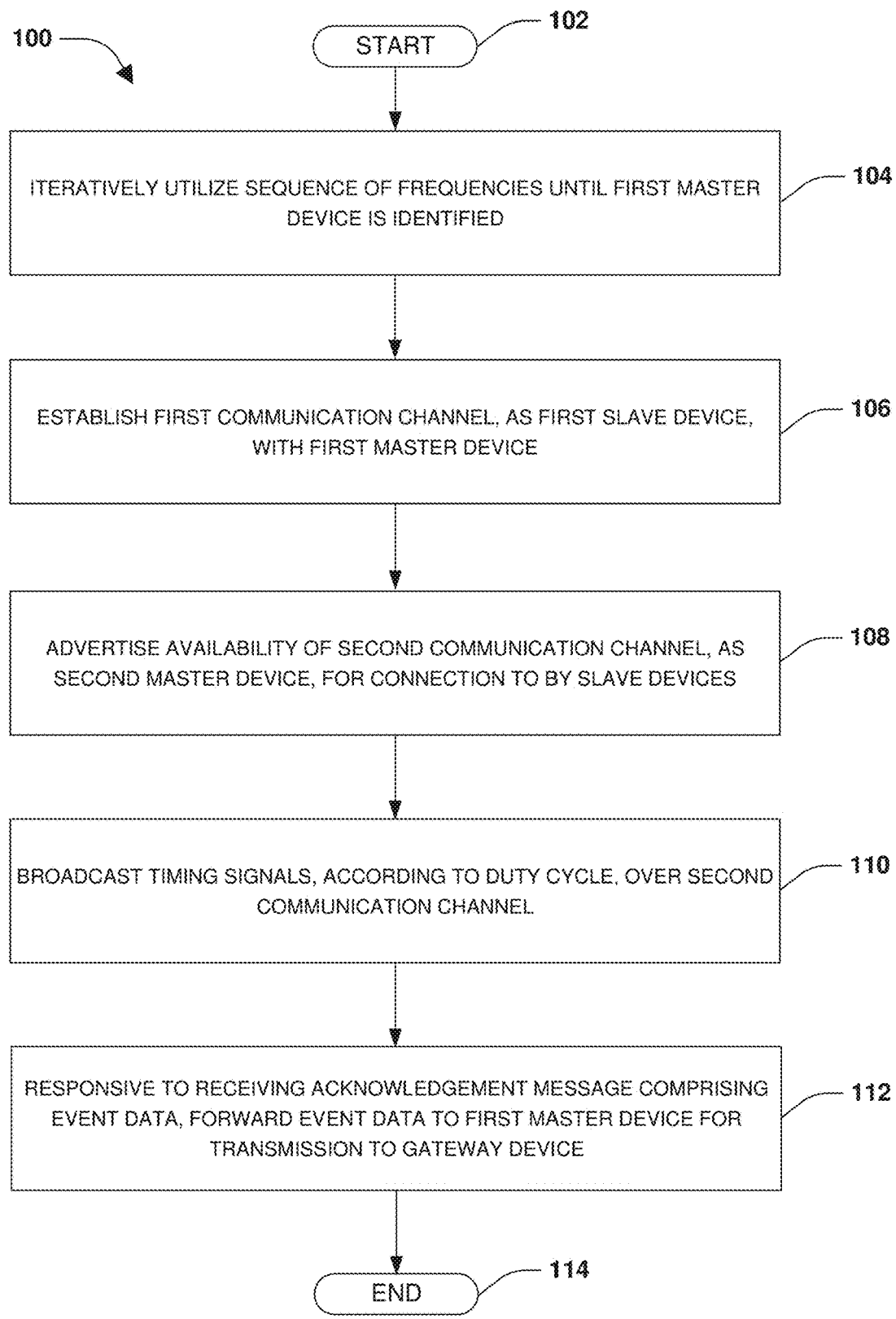
FIG. 1 is a flow diagram illustrating an example method of automatic formation of a wireless sensor network.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of wireless sensor network formation, power management, and/or self-healing is illustrated by an exemplary method 100 of FIG. 1. At 102, the method starts. A wireless sensor network may be automatically formed using one or more gateways, hub devices configured to forward messages, and/or endpoints configured to transmit messages. In an example, the wireless sensor network may comprise an ANT network. In another example, the wireless sensor network may be configured according to a non-routing table broadcast configuration, such as where messages are broadcast as opposed to using a routing table that may otherwise need to be continuously updated to provide routing to a specific device. In another example, the wireless sensor network may be configured according to a non-centralized network coordinator configuration, such as where devices can self-join and self-configure into the wireless sensor network without a network coordinator. A communication channel, within the wireless sensor network, may have a master device and a slave device (e.g., the slave device may transmit acknowledgment messages to the master device in response to messages, such as timing signals, broadcast from the master device). A device may be associated with one or more communication channels, such as up to 8 communication channels. Communication channels may be bidirectional, such as where a message is sent through one or more hub devices to the gateway device or from the gateway device to a hub device or endpoint (e.g., a device identified by a device ID). The gateway device may have a network connection (e.g., an internet connection, such as to a remote server or cloud computing environment), such as an Ethernet connection, a WiFi connection, or a cellular connection.

In an example, a hub device, configured to forward messages from one or more slave devices (e.g., a second hub device connected to the hub device, an endpoint connected to the hub device, etc.), may automatically join the wireless network, such as upon power up. The hub device may comprise a person counter, a hygiene event detection device, a hygiene device (e.g., a dispenser, a flush valve, a paper towel dispenser, etc.), a wireless device or sensor, and/or any other device with wireless communication capabilities. At 104, the hub device may iteratively utilize a sequence of frequencies until a first master device, advertising an available address for slave devices to join, is identified. For example, the sequence of frequencies may be attempted in increasing order (e.g., a first frequency may be utilized before a second frequency based upon the first frequency being less than the second frequency). A frequency may be indicative of a number of hops to a gateway device from a master device. In an example where multiple master devices are identified for a frequency, a master device may be selected based upon a signal strength criteria (e.g., selecting a master device with a stronger communication signal), a load criteria (e.g., selecting a master device with a lighter load), or any other operational statistics. The first master device may comprise a gateway device (e.g., broadcasting availability on a lowest frequency) or a second hub device advertising a path connection to the gateway device through the wireless sensor network.

In an example, the hub device may attempt to determine a number of viable master devices available for connection to by the hub device. The hub device may store, transmit (e.g., to another hub device, to a slave device, to a master device, through the gateway device to a remote server, etc.), and/or display information regarding the number of viable master devices (e.g., identification information for each master device, signal strengths, hop numbers, a notification that the number of viable master devices is below a threshold, etc.). In an example, if the number of viable master devices is below the threshold (e.g., the threshold may be defined for the hub device, while a different threshold may be defined for an end point or other device), then the notification may be sent so that a network installer may take such information into consideration when installing hub devices for improved network communication.

At 106, responsive to identifying the first master device, a first communication channel, where the hub device is a first slave device of the first communication channel, is established with the first master device. At 108, the hub device may advertise availability of a second communication channel, where the hub device is a second master device for the second communication channel, for connection to by slave devices (e.g., endpoints and/or other hub devices). The second master device may be configured to forward event data, received over the second communication channel from a connected slave device (e.g., another hub device or endpoint connected as a slave device to the hub device using the second communication channel), over the first communication channel to the first master device for transmission to the gateway device.

At 110, the hub device may be configured to broadcast timing signals (e.g., as the second master device for the second communication channel), according to a duty cycle (e.g., specifying that the hub device is to sleep in a low power sleep state, and to awaken every 2 seconds to broadcast timing messages and listen for acknowledgement messages until returning to the low power sleep state), over the second communication channel for one or more connected slave devices. For example, the hub device may transition into an awakened state based upon the duty cycle indicating that a new timing signal is to be broadcast. While in the awakened state, the hub device may broadcast the new timing signal to one or more connected slave devices (e.g., the new timing signal may be broadcast to all connected slave devices and may be merely addressed to a particular connected slave device to provide a response). The hub device may listen for acknowledgement messages from one or more connected slave devices. The hub device may transition into a low power sleep state based upon completion of acknowledgement message processing (e.g., after forwarding event data received through an acknowledgment message from an endpoint). In this way, the one or more connected slave devices may synchronize timing of transitions between sleep and awakened states for improved power consumption. Because power consumption is improved, the hub device and/or other devices of the wireless sensor network may be powered by a battery power source. In an example, devices of the wireless sensor network may avoid radio frequency (RF) interference by shifting time slots used to broadcast timing signal. For example, the hub device may listen to the second communication channel to determine whether noise of the second communication channel exceeds a threshold (e.g., listen before speaking). If the noise exceeds the threshold, then the hub device may shift time slots.

At 112, responsive to receiving, over the second communication channel, an acknowledgment message, comprising event data, from the connected slave device in response to a timing signal (e.g., a dispenser may provide a dispense count as the event data, a people counter may provide diagnostic information as the event data, etc.), the event data may be forwarded to the first master device for transmission to the gateway device (e.g., to send over a network to remote device, such as a server configured to process hygiene event data). In an example, the acknowledgment message may be evaluated to determine that the connected slave device has a set of event data to transmit. As opposed to broadcasting a next timing signal for a next connected slave device to respond, the hub device may transmit a series of timing signals for the connected slave device to respond with event data of the set of event data (e.g., continuously poll the connected slave device until a backlog of event data has been transmitted).

In an example, a slave device may awaken according to a first duty cycle, having a faster awakening rate than a second duty cycle of a master device, to listen for timing signals from the master device (e.g., the slave device looks for timing signals at a faster rate than the master device sending timing signals, while the master device normally awakens at a slower rate until the master device experiences higher traffic and thus increases the rate of sending timing signals). The slave device may be configured to accept a threshold number of missed timing signals without identifying an error (e.g., the slave device may accept an appropriate number of missed timing signals due to the difference in duty cycles).

In an example of bidirectional communication, a gateway broadcast message may be received by the hub device from the gateway device (e.g., received from the gateway device or another hub device passing the gateway broadcast message along the first communication channel). In an example, the gateway broadcast message may specify a heartbeat request (e.g., the gateway device may not have received event data from an endpoint within a threshold amount of time). In another example, the gateway broadcast message may specify a configuration change (e.g., a turn off message for a dispenser, a dispense dosage amount change, etc.).

The hub device may perform various functions to improve performance of the wireless sensor network. In an example, the hub device may increase the duty cycle responsive to determining that communication traffic of the second communication channel exceeds a threshold. In another example, the hub device may establish a redundant communication channel, where the hub device is a new master device for the redundant communication channel, for connection to by at least one of the one or more connected slave devices. In another example, communication traffic of the second communication channel may be evaluated. Responsive to the communication traffic exceeding a threshold, the hub device may advertise availability of a third communication channel, where the hub device is a new master device for the third communication channel, for connection to by slave devices. The new master device may be configured to forward event data, received over the third communication channel, from one or more new connected slave devices, over the first communication channel to the first master device for transmission to the gateway device. The new master device may drop one or more connected slave device from the second communication channel for reconnection, such as for reconnection to the third communication channel.

In an example, the hub device may seek out a new communication channel for forwarding messages to the gateway device. For example, the hub device may determine that the first master device is overloaded. Accordingly, the hub device may establish a new communication channel, as a new slave device for the new communication channel, with a new master device. In another example, responsive to a loss of the first communication channel with the first master device, the hub device may attempt to establish a new communication channel, where the hub device is a new slave device for the new communication channel. If the hub device is unable to establish the new communication channel (e.g., a new pathway to the gateway device), then the hub device may remove the second communication channel so that connected slave devices may seek new master devices.

In an example, the hub device may be configured implement self-healing for the wireless sensor network. For example, the hub device may determine that the first master device is not in an operational state (e.g., a loss of power) and/or that a timing signal has not been received for a threshold number of duty cycles from the first master device. The hub device may iteratively utilize the sequence of frequencies until a new master device is identified. The hub device may establish a new communication channel, where the hub device is a new slave device for the new communication channel, with the new master device for forwarding event data through the new master device to the gateway device.

Figure 2A:
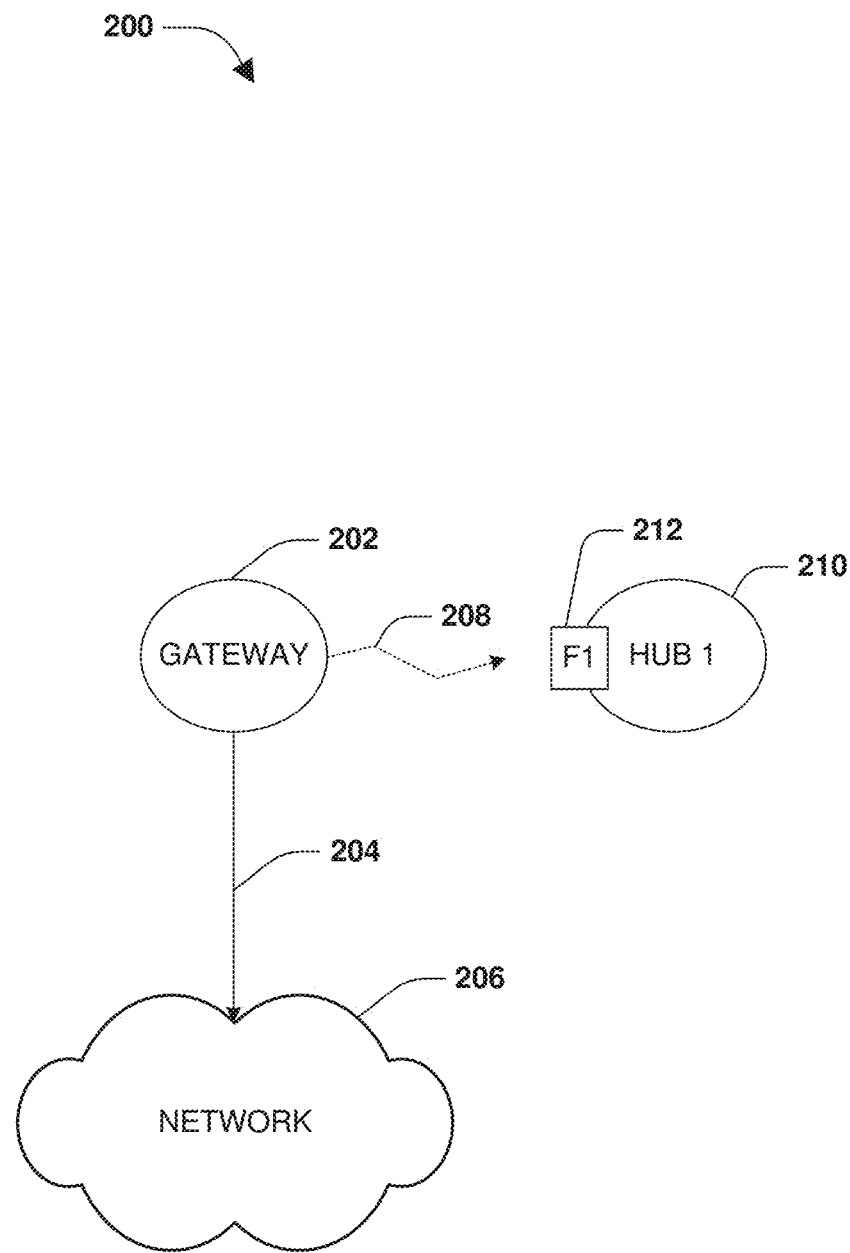
FIG. 2A is a component block diagram illustrating an example system for automatic formation of a wireless sensor network, where a first hub device utilizes a first frequency to search for a master device.
Figure 2B:
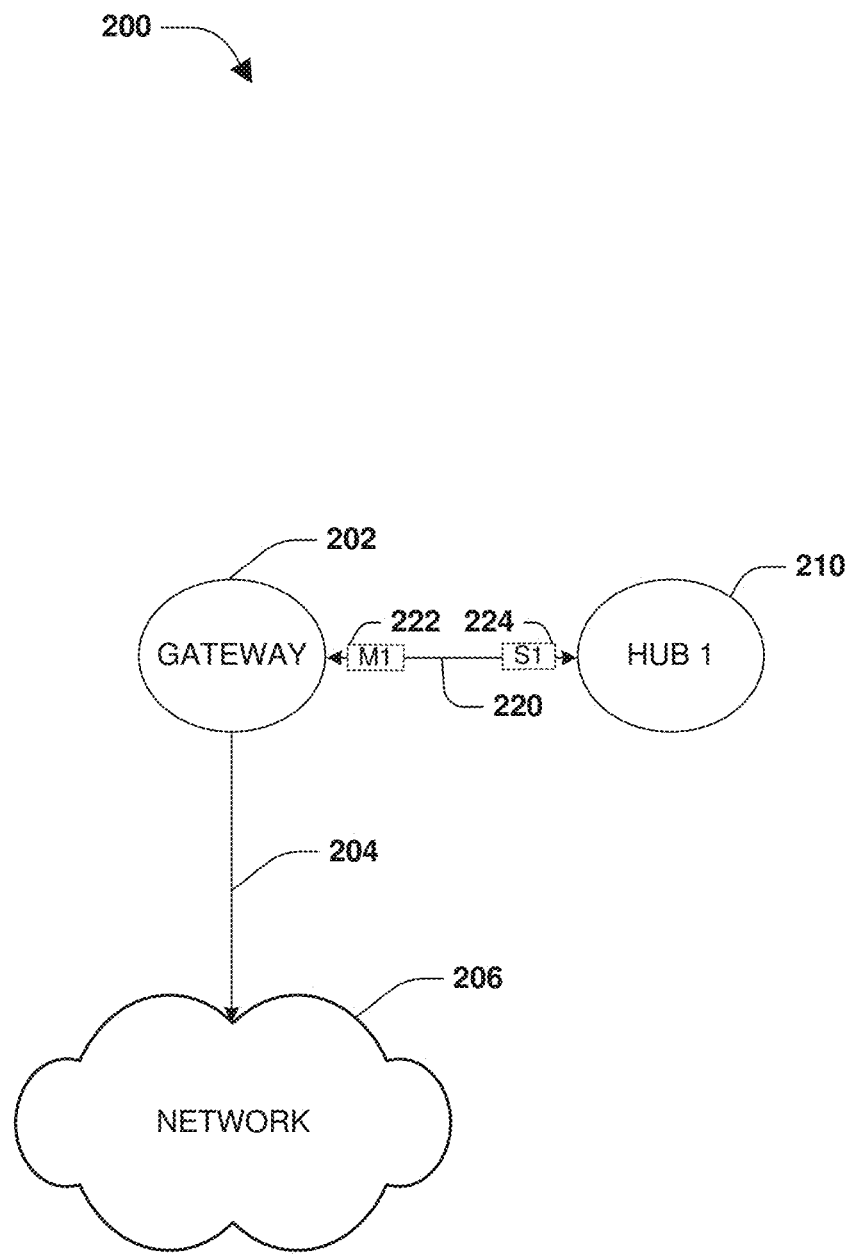
FIG. 2B is a component block diagram illustrating an example system for automatic formation of a wireless sensor network, where a first hub device connects to a gateway device.

FIGS. 2A-2E illustrate examples of a system 200 for automatically forming a wireless sensor network. FIG. 2A illustrates a gateway device 202 having a connection 204 to a network 206. The connection may be a WiFi connection, and Ethernet connection, a cellular connection, etc. The gateway device 202 may broadcast 208, using a first frequency 212 corresponding to a gateway identifier frequency, an availability address for slave devices to join, where the gateway device 202 would be a first master device. A first hub device 210 may iteratively utilize a sequence of frequencies until a master device is identified to join (e.g., in response to being powered up, during self-healing where a prior master device became inoperable, etc.). For example, the first hub device 210 may listen using the first frequency 212, and thus the first hub device 210 may receive the broadcast 208 and identify the gateway device 202 as the first master device to join. FIG. 2B illustrates the first hub device 210 establishing a first communication channel 220, where the first hub device 210 is a first slave device 224 for the first communication channel 220 and the gateway device 202 is the first master device 222 for the first communication channel 220. In this way, one or more endpoints (e.g., a dispenser, a people counter, a paper towel dispenser, a sensor, etc.) may join communication channels of the first hub device 210, where the first hub device 210 is a master device and the one or more endpoints are slave devices, such that the first hub device 210 may forward messages, from the endpoints, over the first communication channel 220 to the gateway device 202 for transmission over the network 206. Similarly, the gateway device 202 may broadcast messages over the first communication channel 220 for the first hub device 210 and/or other hub devices and endpoints.

Figure 2C:
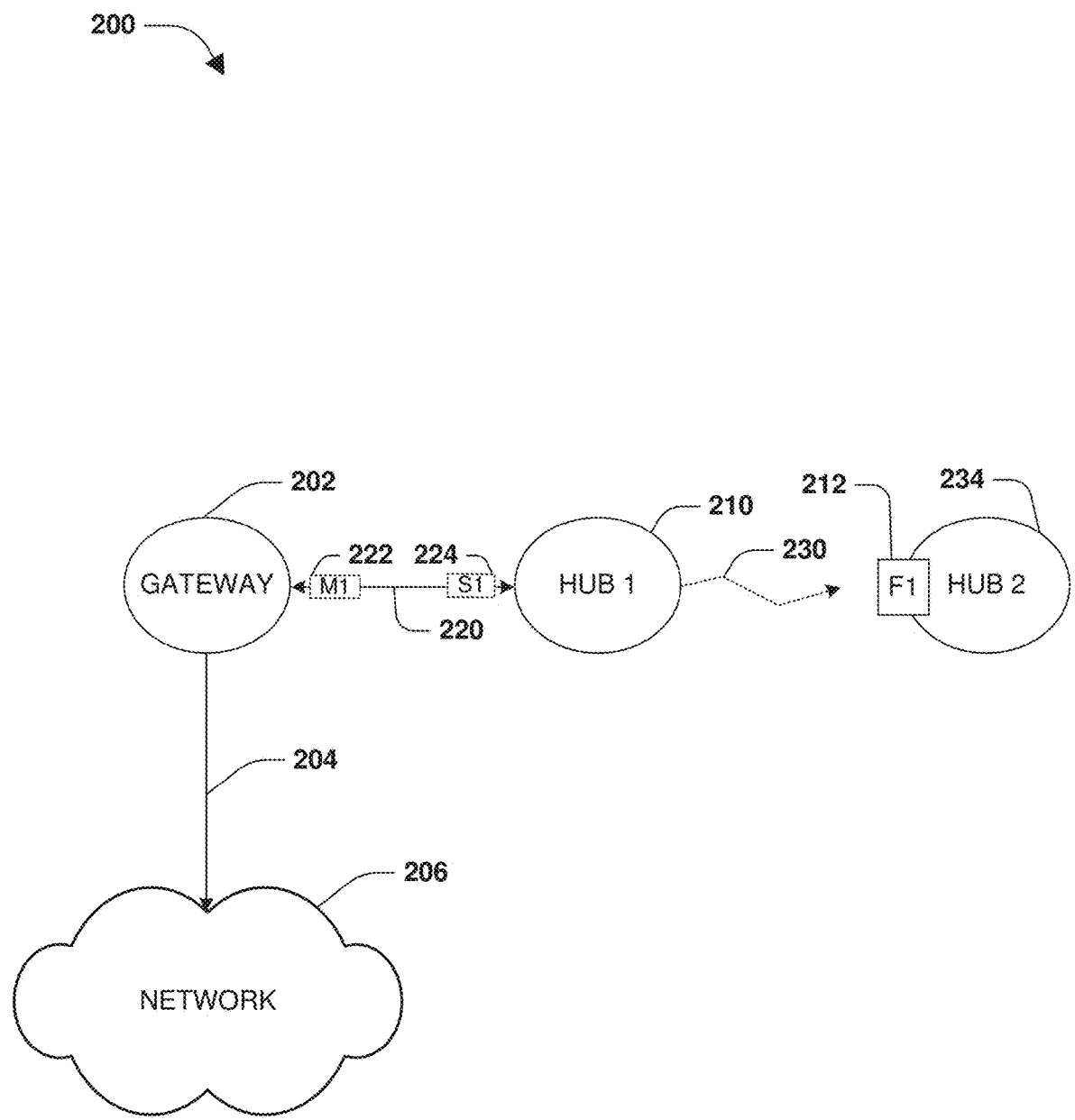
FIG. 2C is a component block diagram illustrating an example system for automatic formation of a wireless sensor network, where a first hub device broadcasts availability of a communication channel using a second frequency.

FIG. 2C illustrates the first hub device 210 broadcasting an advertisement 230 of a second communication channel 250 (e.g., an available address to which slave devices may connect), where the first hub device 210 will be a second master device 252 for the second communication channel 250, for connection to by slave devices. Because the first hub device 210 is one hop away from the gateway 202, the advertisement 230 may be broadcast at a second frequency 240 that is greater than the first frequency 212 with which the gateway device 202 broadcasted 208.

Figure 2D:
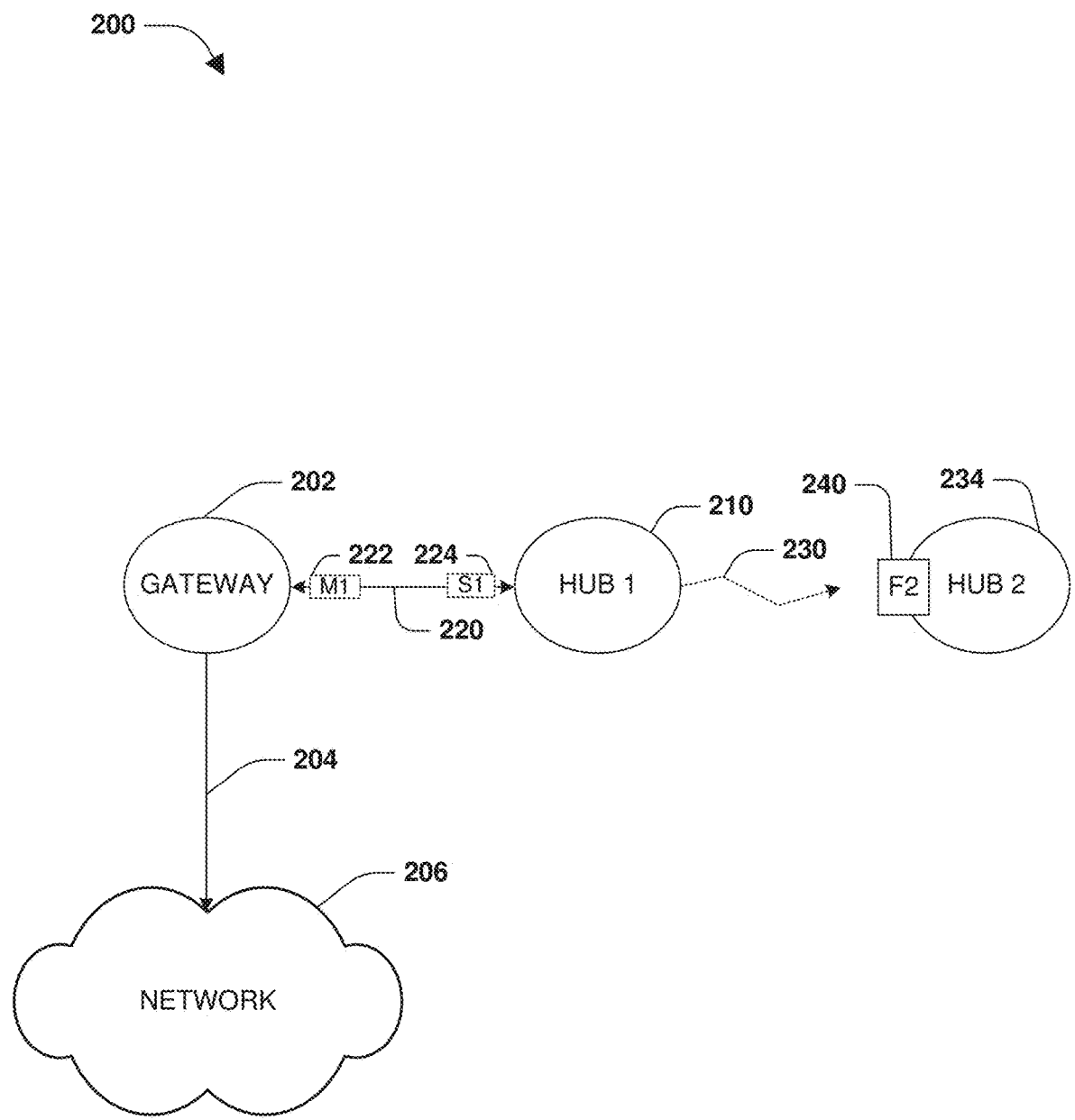
FIG. 2D is a component block diagram illustrating an example system for automatic formation of a wireless sensor network, where a second hub device utilizes a second frequency to search for a master device.

A second hub device 234 may iteratively utilize the sequence of frequencies until a master device is identified to join (e.g., in response to being powered up, during self-healing where a prior master device became inoperable, etc.). For example, the second hub device 234 may listen using the first frequency 212. The second hub device 234 may not identify a master device broadcasting at the first frequency 212 because the first hub device 210 is broadcasting the advertisement 230 at the second frequency 240 and/or the gateway device 202 is not within communication range. Accordingly, the second hub device 234 may listen using the second frequency 240, and thus the second hub device 234 may receive the broadcast of the advertisement 230, as illustrated in FIG. 2D.

Figure 2E:
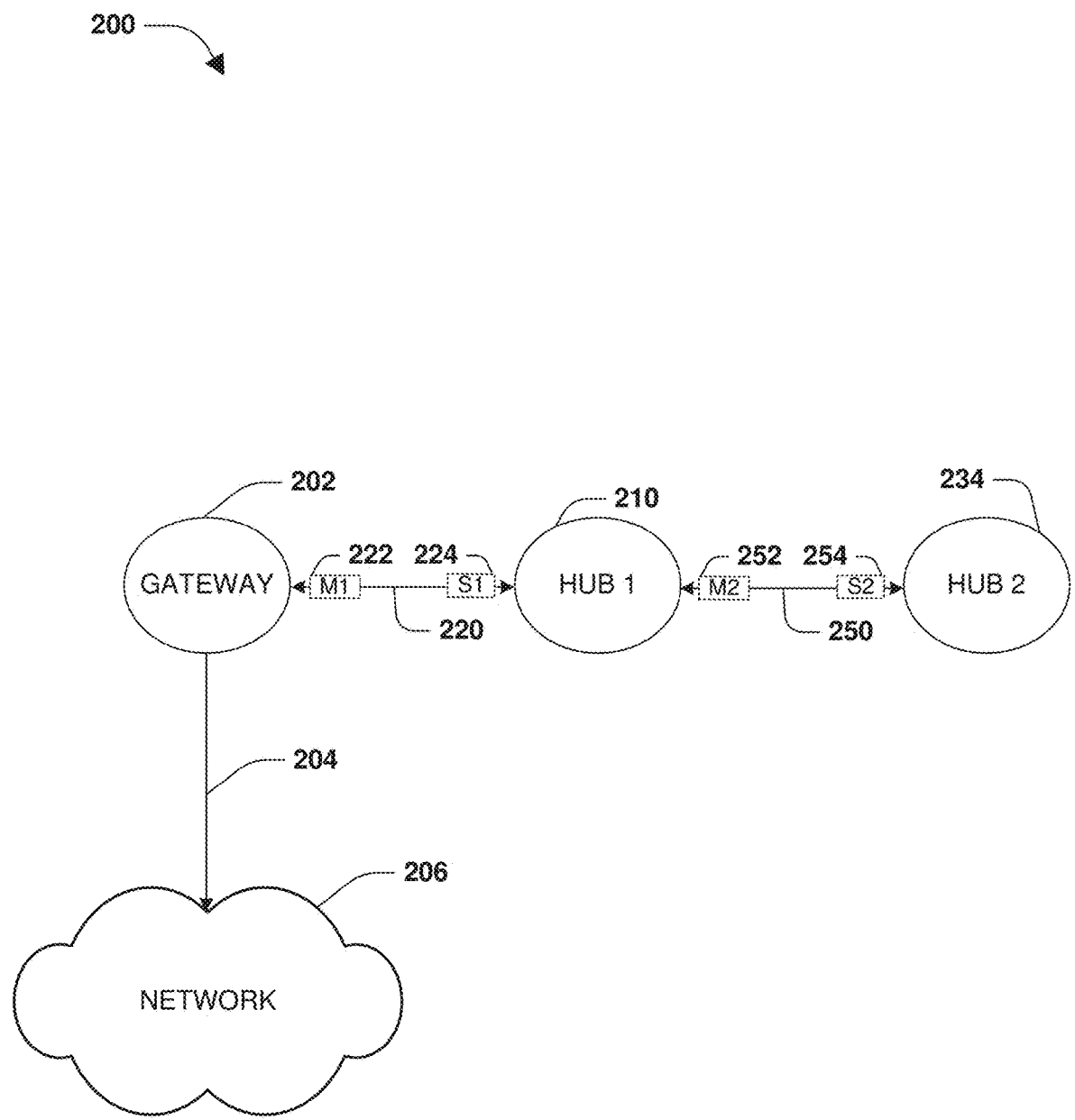
FIG. 2E is a component block diagram illustrating an example system for automatic formation of a wireless sensor network, where a first hub device connects to a second hub device.

FIG. 2E illustrates the second hub device 234 establishing the second communication channel 250, where the second hub device 234 is a second slave device 254 for the second communication channel 250 and the first hub device 210 is the second master device 252 for the second communication channel 250. In this way, one or more endpoints (e.g., a dispenser, a people counter, a paper towel dispenser, a sensor, etc.) may join communication channels of the second hub device 234, where the second hub device 234 is a master device and the one or more endpoints are slave devices, such that the second hub device 234 may forward messages, from the endpoints, over the second communication channel 250 (e.g., and through the first hub device 210 and over the first communication channel 220) to the gateway device 202 for transmission over the network 206. It may be appreciated that any number of gateways, hubs, and/or endpoints may be automatically added and configured into the wireless sensor network.

FIGS. 3A-3E illustrate examples of a system 300 for power management within a wireless sensor network. The wireless sensor network may comprise a gateway device 302 having a connection 304 to a network 306. The wireless sensor network may comprise a first hub device 308 connected to the gateway device 302 through a first communication channel 310, where the gateway device 302 is a first master device 312 and the first hub device 308 is a first slave device 314 for the first communication channel 310. The wireless sensor network may comprise a second hub device 316 connected to the first hub device 308 through a second communication channel 318, where the first hub device 308 is a second master device 320 and the second hub device 316 is a second slave device 322 for the second communication channel 318. The wireless sensor network may comprise a third hub device 324 connected to the second hub device 316 through a third communication channel 326, where the second hub device 316 is a third master device 328 and the third hub device 324 is a third slave device 330 for the third communication channel 326.

One or more endpoints may connect to hub devices of the wireless sensor network as slave devices. For example, a first endpoint 332, a second endpoint 334, and a third endpoint 336 may have connected to the first hub device 308. A fourth endpoint 338, a fifth endpoint 340, and a sixth endpoint 342 may have connected to the second hub device 316. A seventh endpoint 344, an eighth endpoint 346, and a ninth endpoint 348 may have connected to the third hub device 324.

In an example, the first hub device 308 may be configured to transition into a low power sleep state, and then awaken every 3 seconds or any other time period based upon a first duty cycle to transmit timing signals to the first endpoint 332, the second endpoint 334, and/or the third endpoint 336, before transitioning back into the low power sleep state after receiving and/or processing any acknowledgement messages provided by the endpoints in response to the timing signals. The first endpoint 332, the second endpoint 334, and/or the third endpoint 336 may synchronize timing of transitioning between low power sleep states and awakened states based upon the first duty cycle of the first hub device 308. Similarly, other hub devices and/or endpoints may synchronize timing of transitioning between low power sleep states and awakened states for improved power conservation within the wireless sensor network (e.g., the fourth endpoint 338, the fifth endpoint 340, and the sixth endpoint 342 may synchronize with a second duty cycle, the same or different than the first duty cycle, of the second hub device 316). Hub devices and/or endpoints that are in the low power sleep state are illustrated, within FIGS. 3A-3E, with a dotted fill pattern, while hub devices and/or endpoints that are in an awakened normal operating state are illustrated with no fill.

Figure 3A:
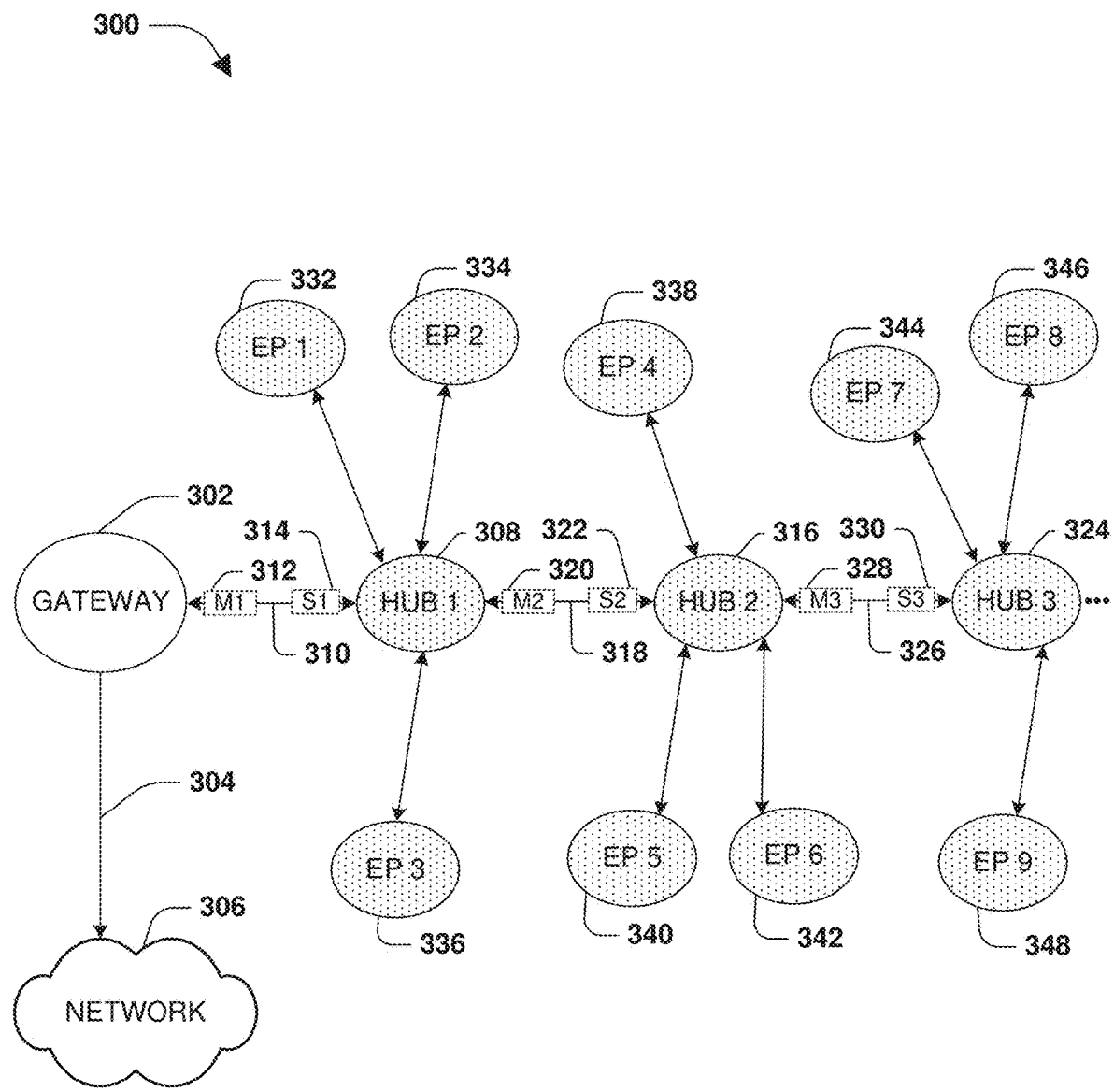
FIG. 3A is a component block diagram illustrating an example system for power management of a wireless sensor network, where one or more hub devices and/or endpoints are in a low power sleep state.
Figure 3B:
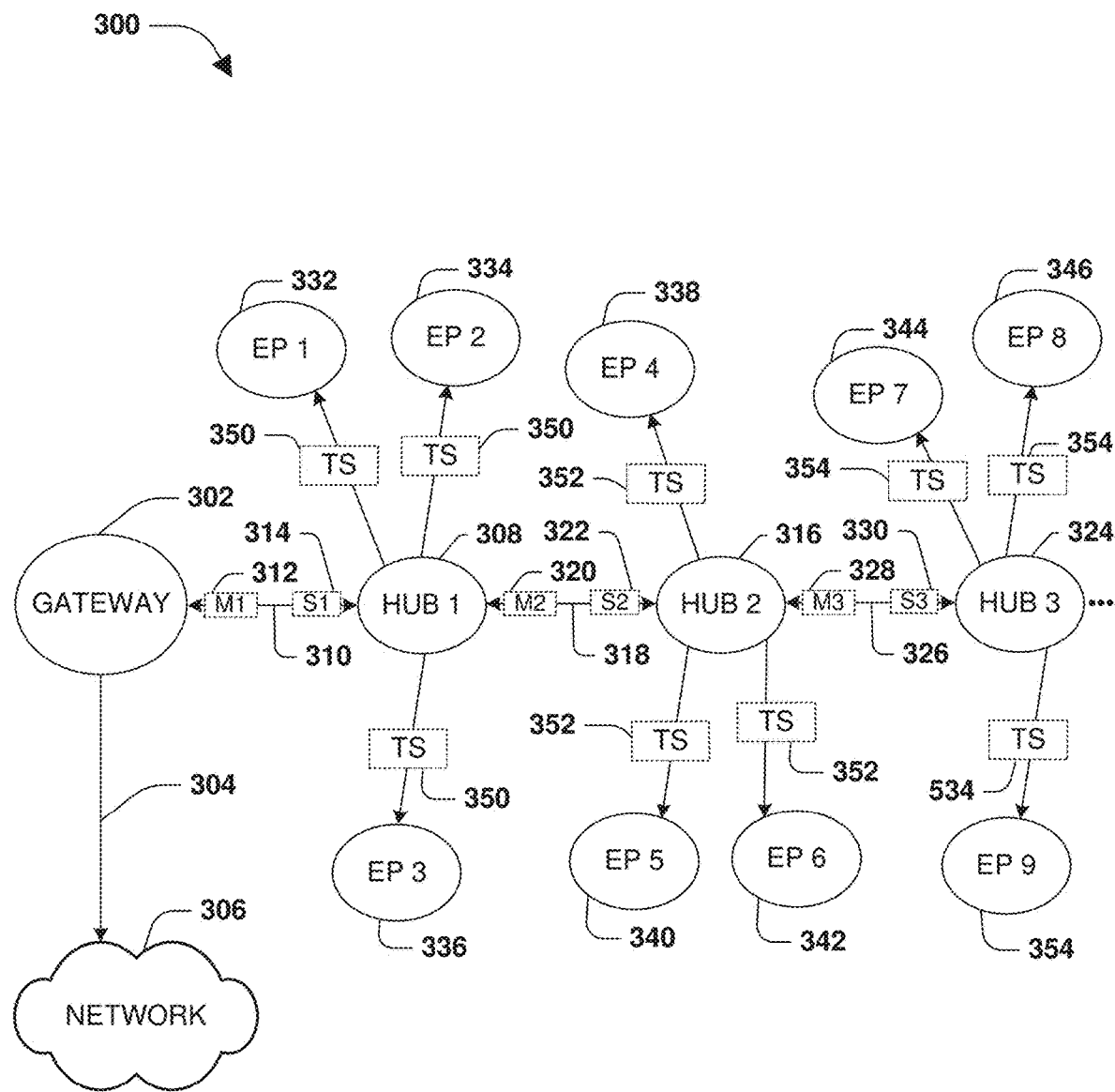
FIG. 3B is a component block diagram illustrating an example system for power management of a wireless sensor network, where one or more hub devices and/or endpoints are awakened for timing signal and acknowledgment message broadcasting.
Figure 3C:
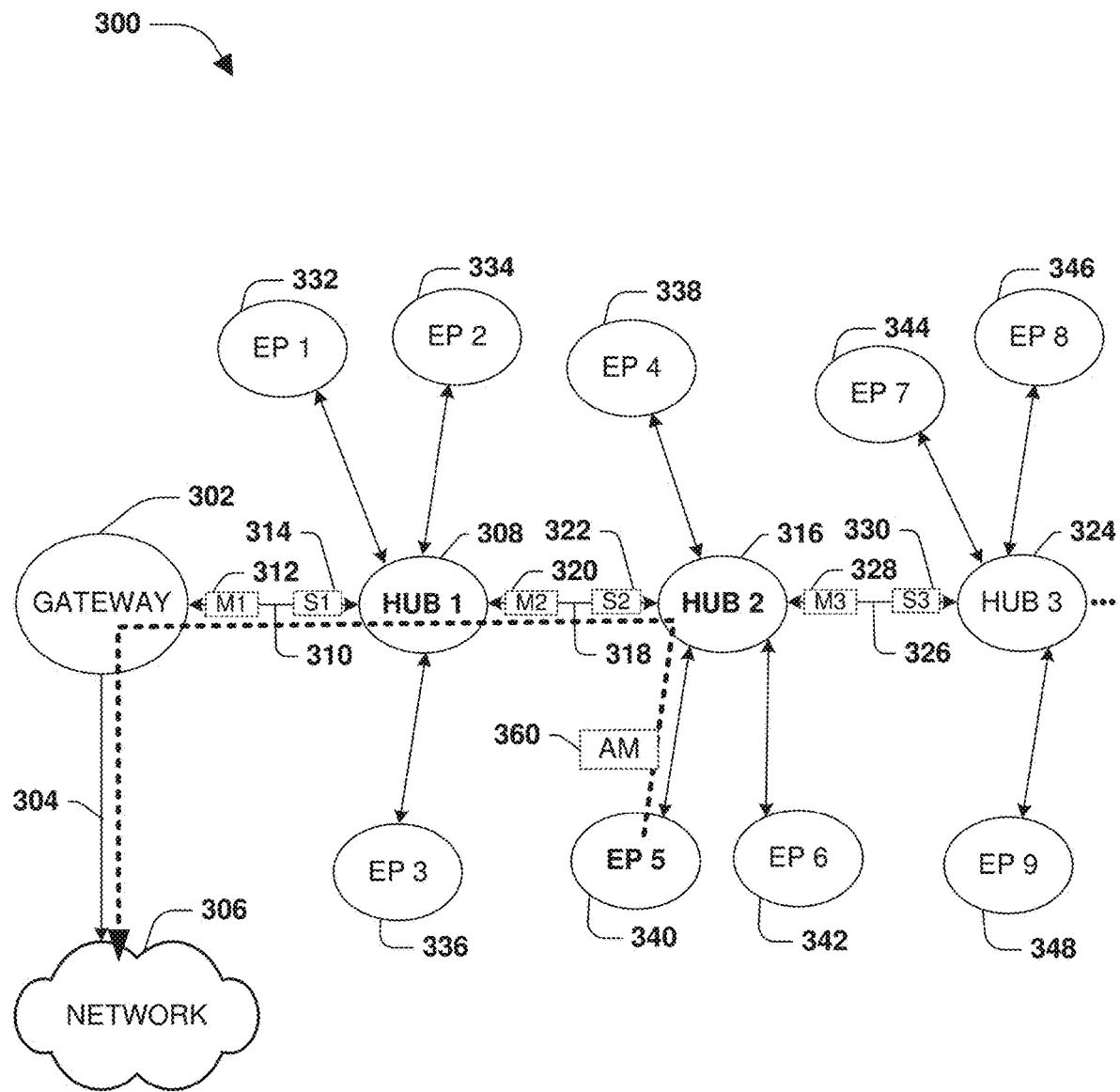
FIG. 3C is a component block diagram illustrating an example system for power management of a wireless sensor network, where a second hub device forwards event data of an acknowledgment signal through the wireless sensor network.
Figure 3D:
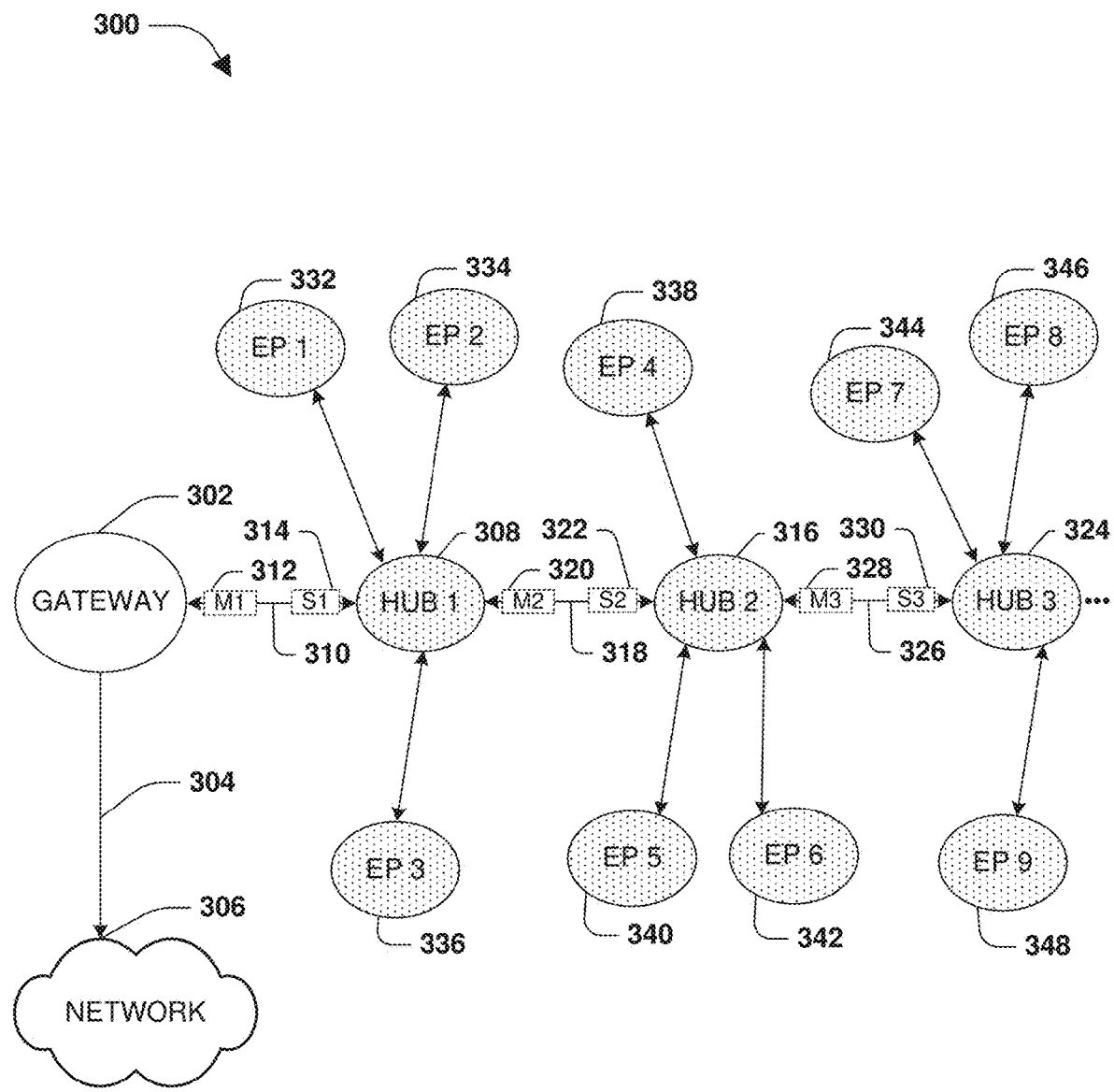
FIG. 3D is a component block diagram illustrating an example system for power management of a wireless sensor network, where one or more hub devices and/or endpoints transition into a low power sleep state.

FIG. 3B illustrates the first hub device 308 and endpoints connected to the first hub device 308, the second hub device 316 and endpoints connected to the second hub device 316, and the third hub device 324 and endpoints connected to the third hub device 324 transitioning from the low power sleep state into the awakened normal operating state. Accordingly, the first hub device 308 may broadcast timing signals 350 to endpoints connected to the first hub device 308, the second hub device 316 may broadcast timing signals 352 to endpoints connected to the second hub device 316, and the third hub device 324 may transmit timing signals 354 to endpoints connected to the third hub device 324. FIG. 3C illustrates the second hub device 316 receiving an acknowledgment message 360 from the fifth endpoint 340 in response to the timing signals 352. The acknowledgement message 360 may comprise event data, such as a hygiene opportunity occurrence detected by the fifth endpoint 340 (e.g., where the fifth endpoint 340 is a hygiene opportunity detection device). The second hub device 316 may forward the event data through the wireless sensor network (e.g., over the second communication line 318, through the first hub device 308, and over the first communication channel 310) to the gateway 302 for transmission through the network 306. FIG. 3D illustrates the hub devices and endpoints transitioning back into the low power sleep state for power conservation.

Figure 3E:
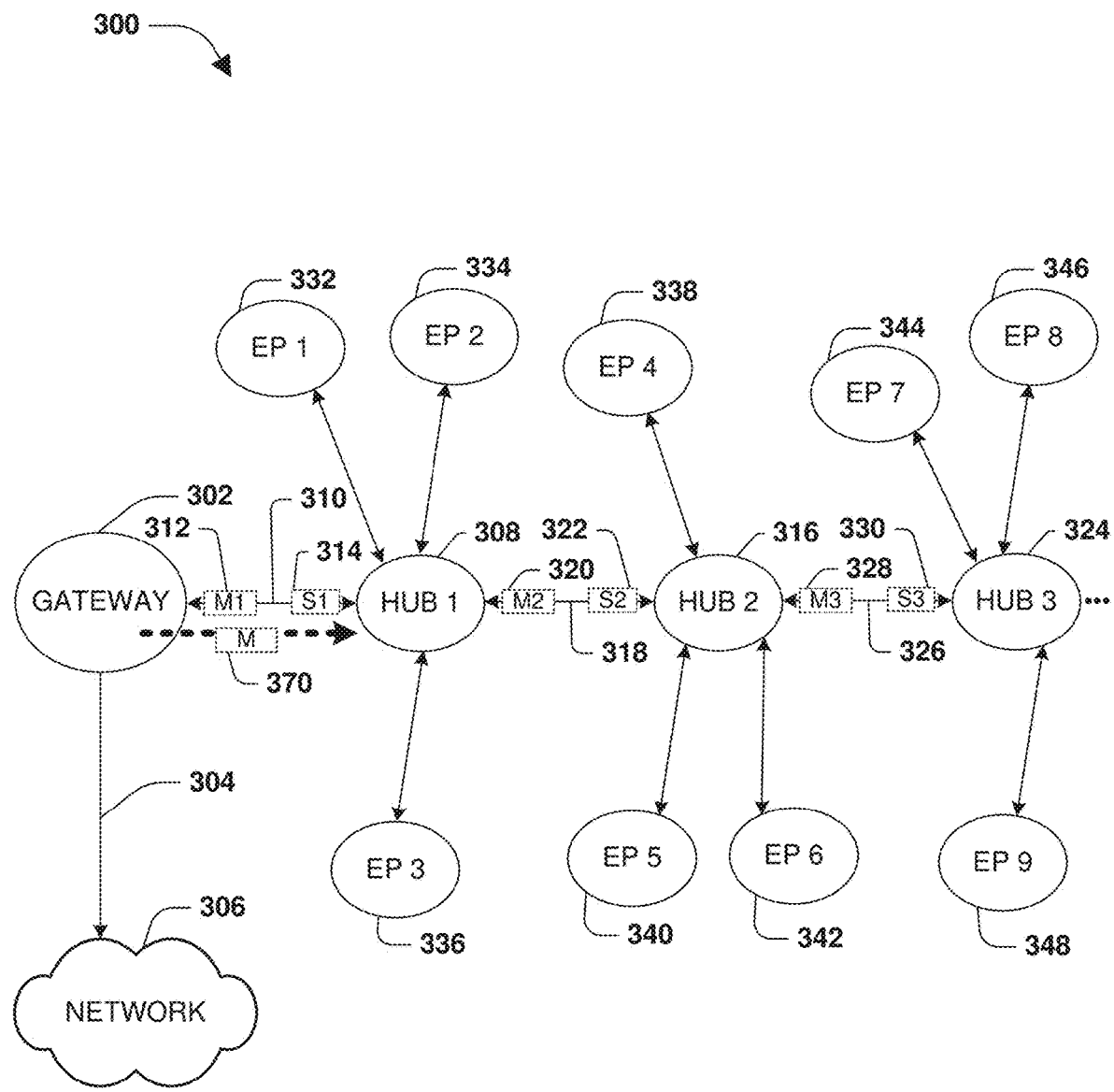
FIG. 3E is a component block diagram illustrating an example system for power management of a wireless sensor network, where a gateway device broadcasts a gateway broadcast message.

FIG. 3E illustrates the gateway device 302 sending a gateway broadcast message 370 over the wireless sensor network. The gateway broadcast message 370 may be broadcast to the first hub device 308, the second hub device 316, and/or the third hub device 324. The gateway broadcast message 370 may comprise a device ID of the seventh endpoint 344 (e.g., the gateway broadcast message 370 may instruct the seventh endpoint 344, such as a dispenser, to change a dispense dosage), such that the seventh endpoint 344 may accept the gateway broadcast message 370 while other endpoints may ignore the gateway broadcast message 370.

Figure 4A:
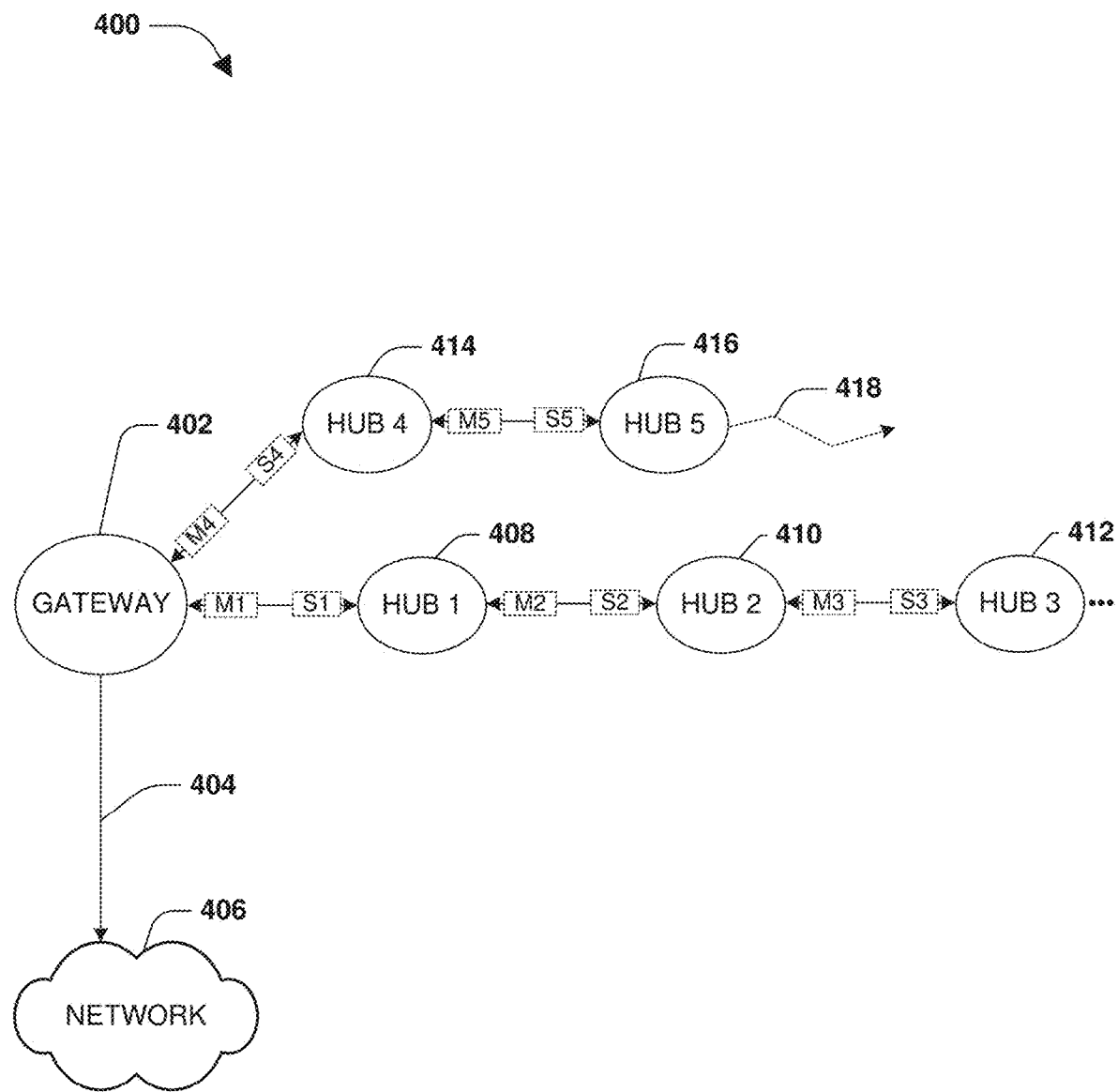
FIG. 4A is a component block diagram illustrating an example system for self-healing within a wireless sensor network.
Figure 4B:
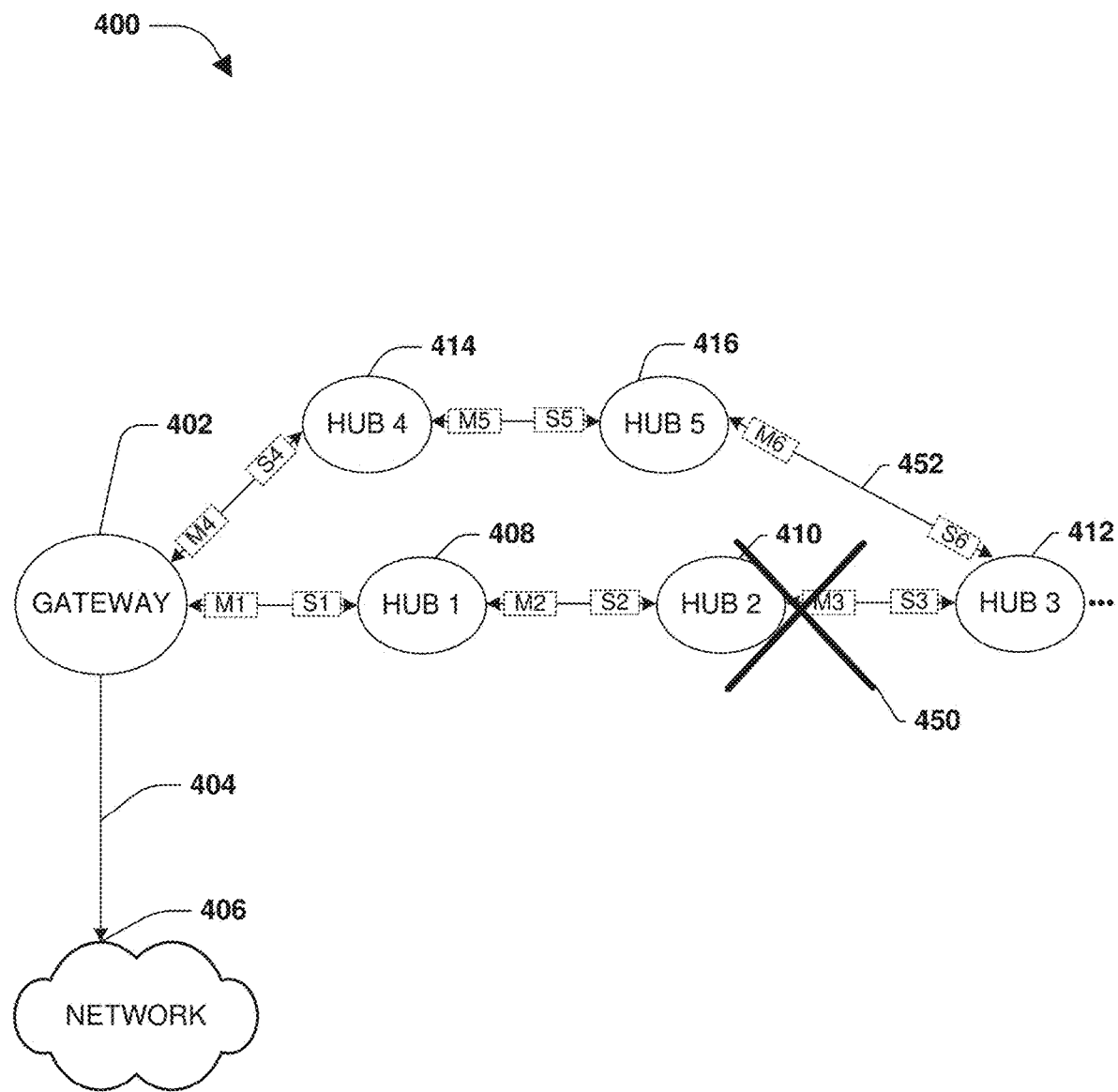
FIG. 4B is a component block diagram illustrating an example system for self-healing within a wireless sensor network, where a third hub device connects to a fifth hub device responsive to determining that a second hub device has become inoperable.

FIGS. 4A-4B illustrate examples of a system 400 for self-healing within a wireless sensor network. For example, the wireless sensor network comprises a gateway 402 having a connection 404 to a network 406, as illustrated in FIG. 4A. The wireless sensor network comprises a first hub device 408, a second hub device 410, a third hub device 412, a fourth hub device 414, a fifth hub device 416, and/or other hub devices connected by communication channels. A hub device, such as the fifth hub device 416, may broadcast 418 availability of a communication channel for connection to by slave devices.

FIG. 4B illustrates the third hub device 412 determining that the second hub device 410 is inoperable 450 (e.g., a loss of power). Accordingly, the first hub device 412 may iterative utilize a sequence of frequencies until a new master device is found. For example, the third hub device 412 may not be within communication range of the gateway device 402 broadcasting at a first frequency (e.g., and thus the third hub device 412 may not detect the gateway device 402 while attempting the first frequency), the first hub device 408 and the fourth hub device 414 broadcasting at a second frequency based upon being a single hop from the gateway device 402 (e.g., and thus the third hub device 412 may not detect the first hub device 408 and the fourth hub device 414 while attempting the second frequency), etc. The third hub device 412 may be within communication range of the fifth hub device 416, and thus may detect, while attempting a third frequency, an advertisement, of an available communication channel, broadcasted by the fifth hub device 416 using the third frequency based upon the fifth hub device 416 being two hops from the gateway device 402. Accordingly, the third hub device 412 may establish a new communication channel 452, where the third hub device 412 is a new slave device and the fifth hub device 416 is a new master device for the new communication channel 452. In this way, the wireless sensor network may self-heal.

Figure 5:
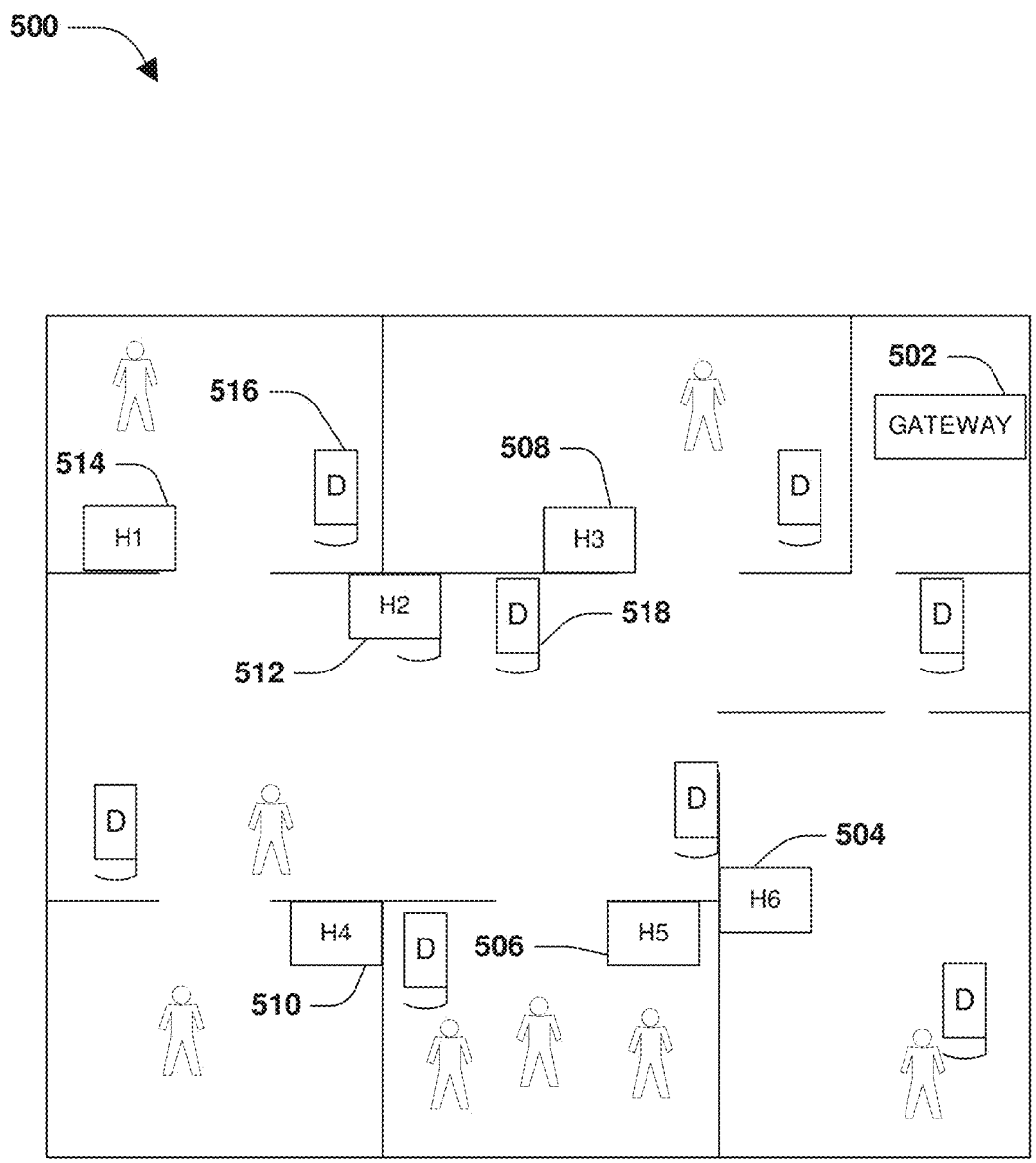
FIG. 5 is an illustration of an example environment within which a wireless sensor network may be automatically formed.

FIG. 5 illustrates a hospital environment 500 within which a wireless sensor network may be automatically formed (e.g., automatic connection and configuration upon device power up). For example, a first hub device 514 may be positioned within a first patient room (e.g., hygiene opportunity detection device). A second hub device 512 may be positioned within a hallway (e.g., a sanitizer dispenser). A third hub device 508 may be positioned within a second patient room (e.g., a hygiene opportunity detection device). A fourth hub device 510 may be positioned within a third patient room (e.g., a people counter used to count people entering or leaving the first patient room). A fifth hub device 510 may be positioned within a fourth patient room (e.g., a paper towel dispenser). A sixth hub device 504 may be positioned within a fifth patient room (e.g., a temperature sensor). The hub devices may establish communication channels between one another so that messages may be broadcast and/or forwarded through the wireless sensor network to a gateway device 502 positioned within a hospital room. Endpoints may connect to hub devices for communication to the gateway device 502. For example, a first dispenser 516 may connect to the first hub device 514, and a second dispenser 518 may connect to the second hub device 512. In this way, the hub devices may forward messages from the endpoints, through the wireless sensor network, to the gateway device 502.

Figure 6:
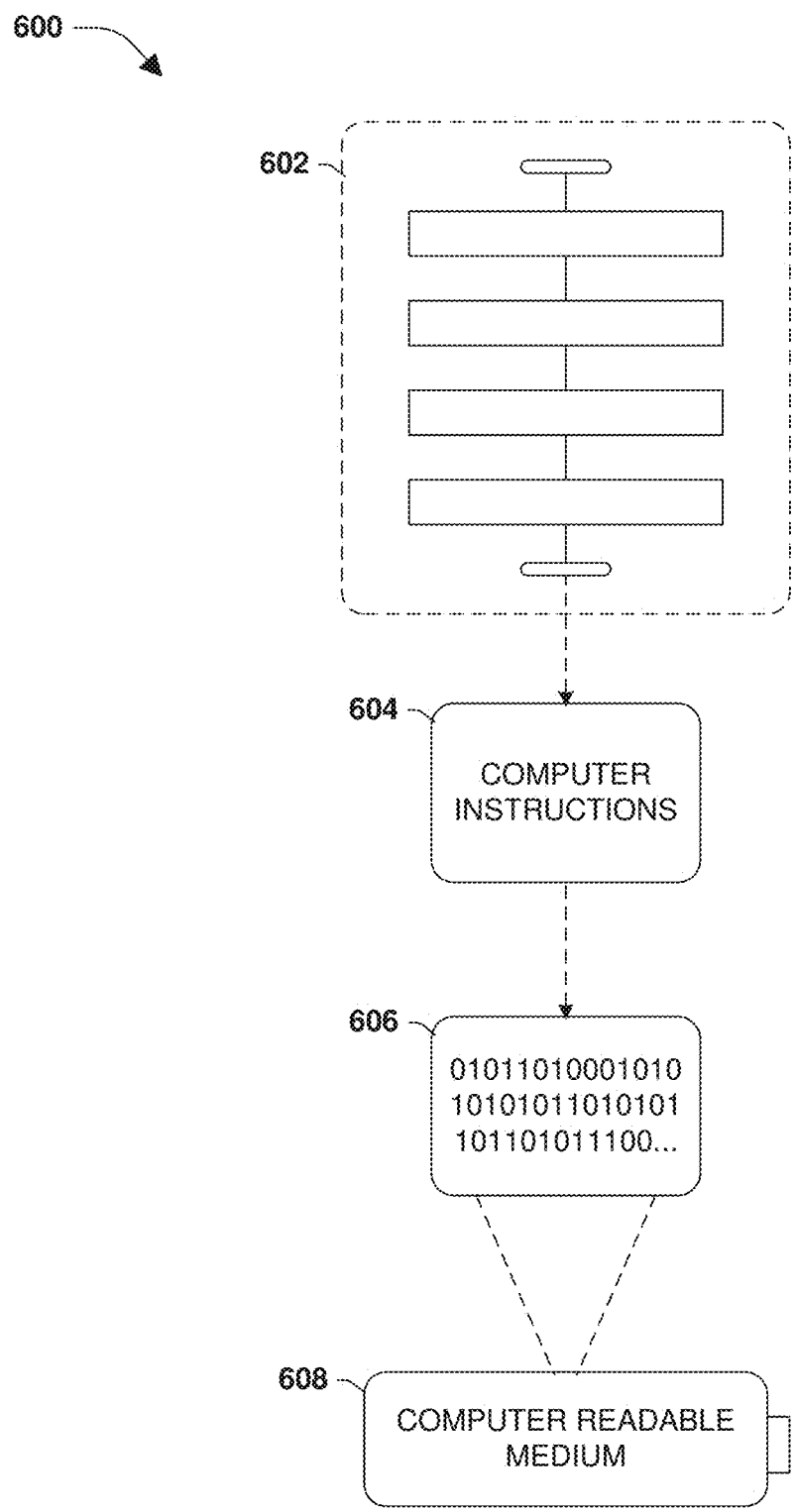
FIG. 6 is an illustration of an example computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 6, wherein the implementation 600 comprises a computer-readable medium 608, such as a CD-ft DVD-R, flash drive, a platter of a hard disk drive, etc., on which is encoded computer-readable data 606. This computer-readable data 606, such as binary data comprising at least one of a zero or a one, in turn comprises a set of computer instructions 604 configured to operate according to one or more of the principles set forth herein. In some embodiments, the processor-executable computer instructions 604 are configured to perform a method 602, such as at least some of the exemplary method 100 of FIG. 1, for example. In some embodiments, the processor-executable instructions 604 are configured to implement a system, such as at least some of the exemplary system 200 of FIGS. 2A-2E, at least some of the exemplary system 300 of FIGS. 3A-3E, and/or at least some of the exemplary system 400 of FIGS. 4A-4B, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
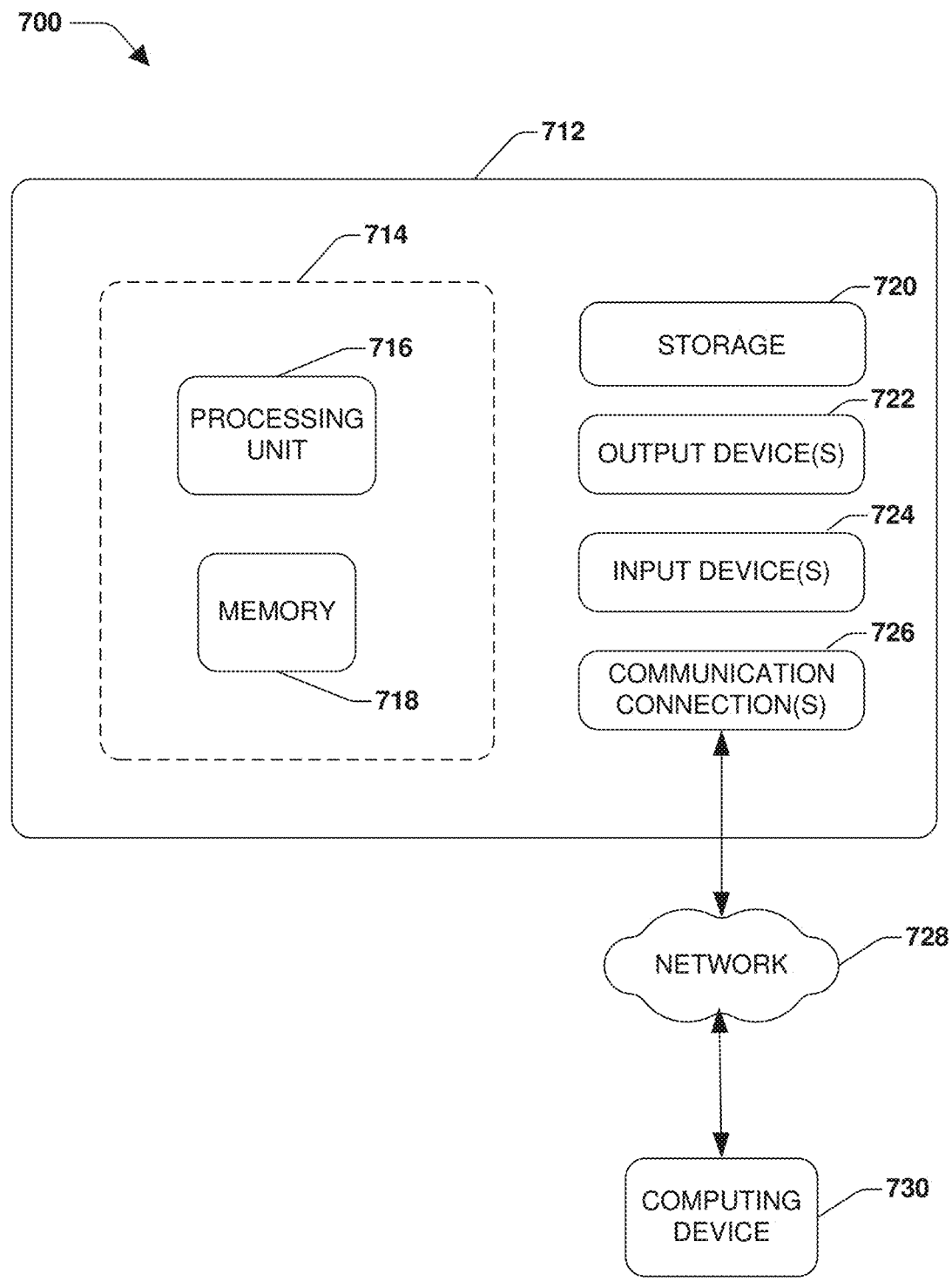
FIG. 7 illustrates an example computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 700 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via a network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system, comprising:
    a processor; and
    memory comprising instructions that when executed by the processor perform operations comprising:
        iteratively listening on a sequence of frequencies until a first device is identified, wherein:
            each frequency of the sequence of frequencies is associated with a specified number of hops to a gateway device, and
            a frequency of a first signal broadcast by the first device for identifying the first device is indicative of a number of hops between the first device and the gateway device.

2. The system of claim 1, wherein the first device is the gateway device or a hub device advertising a pathway connection to the gateway device through a wireless sensor network.

3. The system of claim 1, wherein the operations comprise:
    establishing a first communication channel with the first device responsive to identifying the first device; and
    broadcasting a second signal having a second frequency, wherein the second frequency is incremented by one in the sequence of frequencies relative to the frequency of the first signal broadcast by the first device.

4. The system of claim 3, wherein the operations comprise:
    establishing a second communication channel with a second device responsive to broadcasting the second signal having the second frequency.

5. The system of claim 4, wherein the operations comprise:
    receiving event data from the second device; and
    forwarding the event data to the first device.

6. The system of claim 1, wherein the operations comprise:
    identifying a second device broadcasting a second signal having the frequency of the first signal broadcast by the first device;
    establishing a first communication channel with the first device when a signal strength of the first signal broadcast by the first device is greater than a signal strength of the second signal broadcast by the second device; and establishing a second communication channel with the second device when the signal strength of the second signal broadcast by the second device is greater than the signal strength of the first signal broadcast by the first device.

7. The system of claim 1, wherein the operations comprise:

identifying a second device broadcasting a second signal having the frequency of the first signal broadcast by the first device;

establishing a first communication channel with the first device when a load on the first device is less than a load on the second device; and establishing a second communication channel with the second device when the load on the second device is less than the load on the first device.

8. The system of claim 1, wherein the operations comprise:

establishing a communication channel with the first device responsive to identifying the first device; and receiving a timing signal from the first device, wherein the timing signal indicates a duty cycle between a sleep state and an awakened state of the first device.

9. The system of claim 1, wherein the operations comprise:

establishing a duty cycle;

listening for signals during a first period of time as specified by the duty cycle;

determining that detected noise exceeds a threshold during the first period of time; and changing the duty cycle responsive to the detected noise exceeding the threshold.

10. The system of claim 1, wherein the operations comprise:

establishing a duty cycle;

listening for signals during a first period of time as specified by the duty cycle;

determining that communication traffic exceeds a threshold during the first period of time; and changing the duty cycle responsive to the communication traffic exceeding the threshold.

11. The system of claim 1, the operations comprising:

responsive to determining that at least one of the first device is not in an operational state or a timing signal has not been received from the first device for a threshold number of duty cycles:

iteratively utilizing the sequence of frequencies until a second device is identified; and establishing a communication channel with the second device.

12. A method, comprising:

establishing a first communication channel between a first device of a wireless sensor network and a second device of the wireless sensor network by detecting, at the second device, a first signal broadcast by the first device, wherein:

the first signal has a first frequency, and the first frequency is indicative of a first number of hops between the second device and the first device; and establishing a second communication channel between the second device and a third device by broadcasting, from the second device, a second signal having a second frequency, wherein:

the second frequency is indicative of a second number of hops between the first device and the third device, the second number is greater than the first number by one, and the first communication channel and the second communication channel are used for forwarding event data from the third device to the first device.

13. The method of claim 12, comprising:

iteratively listening on a sequence of frequencies until the first device is identified, wherein:

the sequence of frequencies are arranged in numerical order, and the second frequency is a next lower frequency relative to the first frequency or the second frequency is a next higher frequency relative to the first frequency.

14. The method of claim 12, comprising:

broadcasting timing signals, according to a duty cycle, over the second communication channel, the broadcasting comprising:

transitioning into an awakened state based upon the duty cycle indicating that a new timing signal is to be broadcast;

while in the awakened state:

broadcasting the new timing signal over the second communication channel; and listening for an acknowledgement message over the second communication channel; and transitioning into a sleep state based upon receipt of the acknowledgement message.

15. The method of claim 12, comprising:

responsive to determining that the first device is not in an operational state:

identifying a new device of the wireless sensor network; and establishing a new communication channel between the new device and the second device, wherein the second device forwards event data from the third device through the new communication channel instead of the first communication channel.

16. The method of claim 12, wherein the first device is at least one of a gateway device or a hub device.

17. A method comprising:

iteratively listening on a sequence of frequencies until a first device is identified by a second device, wherein each frequency of the sequence of frequencies is associated with a specified number of hops to a gateway device; and determining a number of hops between the second device and the gateway device based upon a frequency of a first signal broadcast by the first device for identifying the first device.

18. The method of claim 17, comprising:

establishing a first communication channel with the first device responsive to identifying the first device; and broadcasting a second signal having a second frequency, wherein:

the sequence of frequencies are arranged in numerical order, and the second frequency is a next lower frequency relative to the frequency of the first signal broadcast by the first device or the second frequency is a next higher frequency relative to the frequency of the first signal broadcast by the first device.

19. The method of claim 18, comprising:

establishing a second communication channel with a third device responsive to broadcasting the second signal having the second frequency;

receiving event data from the third device; and
forwarding the event data to the first device.

20. The method of claim 17, comprising:
identifying a third device broadcasting a second signal having the frequency of the first signal broadcast by the first device;
establishing a communication channel with the first device when a signal strength of the first signal broadcast by the first device is greater than a signal strength of the second signal broadcast by the third device; and
establishing a communication channel with the third device when the signal strength of the second signal broadcast by the third device is greater than the signal strength of the first signal broadcast by the first device.

* * * * *